United States Patent
Okitsu (10) Patent No.: US 8,701,263 B2
(45) Date of Patent: Apr. 22, 2014

(54) GROMMET OPENING/CLOSING APPARATUS AND METHOD FOR PASSING WIRING HARNESS THROUGH GROMMET BY USING THE SAME

(75) Inventor: Takashi Okitsu, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 529 days.

(21) Appl. No.: 12/736,491

(22) PCT Filed: Mar. 25, 2009

(86) PCT No.: PCT/JP2009/056779
§ 371 (c)(1),
(2), (4) Date: Oct. 13, 2010

(87) PCT Pub. No.: WO2009/128345
PCT Pub. Date: Oct. 22, 2009

(65) Prior Publication Data
US 2011/0030192 A1 Feb. 10, 2011

(30) Foreign Application Priority Data
Apr. 14, 2008 (JP) .................................. 2008-104486

(51) Int. Cl.
*B23P 19/02* (2006.01)
(52) U.S. Cl.
USPC ............................................. 29/450; 29/235
(58) Field of Classification Search
USPC ........... 29/525.01, 450, 700, 281.1, 255, 270, 29/278, 854, 868, 749, 755, 235; 269/43, 269/266, 156, 45
See application file for complete search history.

(56) References Cited

U.S. PATENT DOCUMENTS

| 710,817 | A | * | 10/1902 | Stevens | 29/234 |
| 2,422,065 | A | * | 6/1947 | Anselmi | 29/235 |
| 3,010,194 | A | * | 11/1961 | Fratzke | 29/235 |
| 3,946,480 | A | * | 3/1976 | Dienes | 29/235 |
| 5,265,326 | A | * | 11/1993 | Scribner | 29/758 |
| 6,049,960 | A | * | 4/2000 | Pilling et al. | 29/450 |

(Continued)

FOREIGN PATENT DOCUMENTS

| JP | 05-342928 A | 12/1993 | |
| JP | 08275340 A | * 10/1996 | ............... H02G 3/22 |

(Continued)

OTHER PUBLICATIONS

International Seach Report and Written Opinion dated Jul. 7, 2009, issued for PCT/JP2009/056779.

*Primary Examiner* — David Bryant
*Assistant Examiner* — Darrell C Ford
(74) *Attorney, Agent, or Firm* — Edwards Wildman Palmer LLP (57) ABSTRACT

A grommet opening/closing apparatus includes one opening/closing device and the other opening/closing device. Both opening/closing devices are arranged oppositely against each other, each having a plurality of hooks and a driving unit to open and close the plurality of hooks. A base portion of the plurality of hooks of the one opening/closing device expands and returns one end of a grommet, and a base portion of the plurality of hooks of the other opening/closing device expands and returns the other end of the grommet. One end of the grommet is held by half-opening the hooks of the one opening/closing device, the closed hooks are inserted in the other end of the grommet. Thereafter, the hooks of both opening/closing devices are completely opened, and the wiring harness is passed through the grommet.

17 Claims, 6 Drawing Sheets

(56) References Cited

U.S. PATENT DOCUMENTS

| | | | |
|---|---|---|---|
| 6,217,375 B1 * | 4/2001 | Nagai et al. | 439/501 |
| 6,785,958 B1 * | 9/2004 | Saito et al. | 29/760 |
| 6,836,949 B2 * | 1/2005 | Jahani et al. | 29/450 |
| 6,933,439 B2 * | 8/2005 | Nishihara et al. | 174/481 |
| 6,953,188 B2 * | 10/2005 | Siegel | 269/266 |
| 6,963,029 B1 * | 11/2005 | Rivers et al. | 174/58 |
| 7,202,415 B2 * | 4/2007 | Fujita | 174/72 A |
| 7,451,968 B2 * | 11/2008 | Geldert | 269/258 |
| 7,891,067 B2 * | 2/2011 | Muhlenbruck | 29/235 |
| 2004/0107533 A1 * | 6/2004 | Nishihara et al. | 16/2.1 |

FOREIGN PATENT DOCUMENTS

| | | | | | |
|---|---|---|---|---|---|
| JP | 10-210618 A | | 8/1998 | | |
| JP | 10210618 A | * | 8/1998 | | H02G 1/06 |
| JP | 10-233131 A | | 9/1998 | | |
| JP | 10233131 A | * | 9/1998 | | H01B 13/00 |
| JP | 11004512 A | * | 1/1999 | | H02G 1/14 |
| JP | 2001-025140 A | | 1/2001 | | |
| JP | 2002200531 A | * | 7/2002 | | B23P 19/00 |
| JP | 2004312850 A | * | 11/2004 | | H02G 3/22 |
| JP | 2008-311053 A | | 12/2008 | | |
| JP | 2009261061 A | * | 11/2009 | | H02G 3/22 |

* cited by examiner

GROMMET OPENING/CLOSING APPARATUS AND METHOD FOR PASSING WIRING HARNESS THROUGH GROMMET BY USING THE SAME

BACKGROUND OF THE INVENTION

1. Field of the Invention

The invention relates to a grommet opening/closing apparatus to pass a wiring harness through a grommet, by expanding a diameter of the grommet having a fitting portion at its both ends which is fitted to an opening of a panel or the like, and a method for passing a wiring harness through the grommet by using the grommet opening/closing apparatus.

2. Description of the Related Art

Figure 9A:
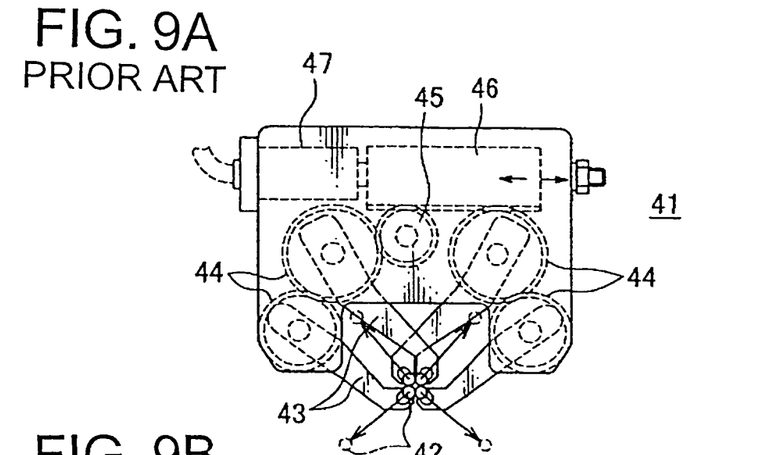
FIG. 9A is a front view of one example of a grommet opening/closing apparatus by prior art.
Figure 9B:
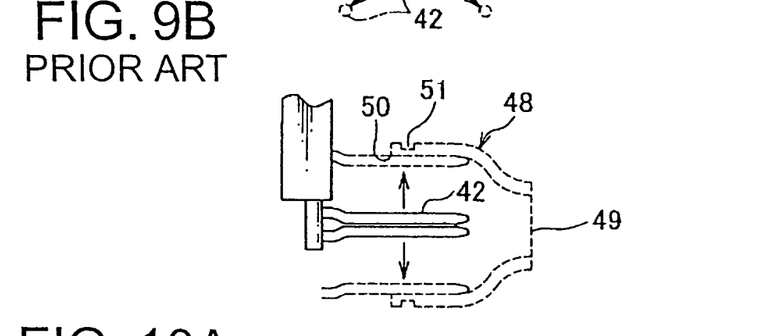
FIG. 9B is a side view of a part of the grommet opening/closing apparatus by prior art shown in FIG. 9A in a condition of expanding a grommet by the hooks.

FIG. 9A and FIG. 9B show one example of a conventional grommet opening/closing apparatus. Structure of the example is shown in Japan Patent published Application No. H5-342928 as of Patent Document 1.

The grommet opening/closing apparatus 41, as shown in FIG. 9A, is also called a grommet stretcher, and includes four pin-shaped hooks 42, four levers 43 each provided with the hook 42 projecting horizontally from a top end portion thereof, gears 44 provided at a base portion of the levers 43, which two gears 44 at two corresponding levers 43 engaging with each other, a pinion 45 engaging with one gear of the other two gears engaging with each other, a rack 46 and an air cylinder 47 to move the rack 46. The rack 46 engages with one gear of the two gears 44 engaging with each other and the pinion 45.

As shown in FIG. 9B, by inserting the hooks 42 inside a waterproof grommet made of synthetic rubber (hereafter called "the grommet") and moving the rack 46 forward by the cylinder 47, the levers 43 rotate together with pinions 44 and 45, and open the hooks 42 so as to expand the grommet 48. Under this condition, a wiring harness (not shown) is passed through the expanded out grommet 48.

The grommet 48 is formed into a cup-shape and has an opening 49 with a small diameter at one side thereof (or of the grommet 48) and an opening 50 with a large diameter at the other side thereof, and a round groove 51 on an outer surface of the opening 50 to fit into a hole (not shown) of a panel of a car body or the like. When a wiring harness (not shown) with a connector at an end thereof is sealed up and fixed at the opening 49 with small diameter (for example, by reeling up the wiring harness with tape), and the round groove 51 is fitted into the hole of the panel, the hole is waterproofed by the grommet 48.

Figure 10A:
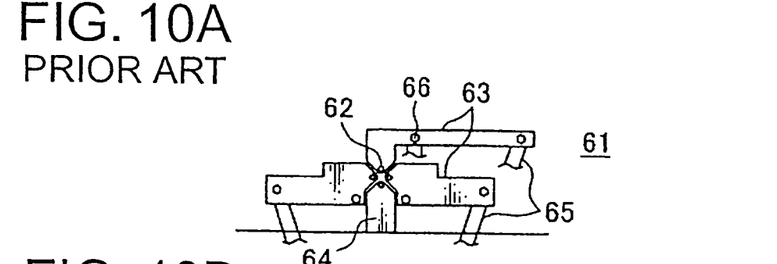
FIG. 10A is a front view of the other example of a grommet opening/closing apparatus by prior art.
Figure 10B:
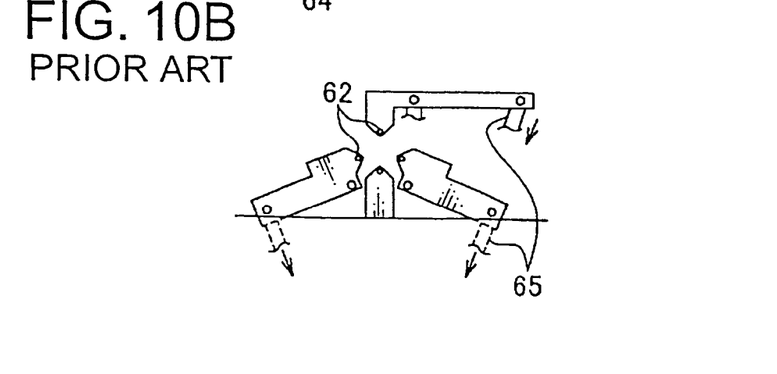
FIG. 10B is a side view of the grommet opening/closing apparatus by prior art shown in FIG. 10A in a condition of opening the hooks.

FIG. 10A and FIG. 10B show another example of a conventional grommet opening/closing apparatus. Structure of the example is shown in Japan Patent published Application H10-233131 as of Patent Publication 2.

This grommet opening/closing apparatus 61 has four pin-shaped hooks 62, movable arms 63, each of the movable arms 63 having a horizontally projected hook 62 fixed on the tip side thereof, links 65 connecting each base side of the movable arms 63, a fixed arm 64 independent from the links 65, an axis 66 holding a intermediate portion of each of the movable arms 63, and a device (not shown) driving each of the links 65 back-and-forth.

Inserting the hooks 62 in a closed condition shown in FIG. 10A into a grommet (not shown) through an opening at a small diameter side thereof, and driving the links 65, as shown in FIG. 10B, so as to open the hooks 62 to expand the small diametric side of the grommet, a wiring harness (not shown) is passed through the grommet. Opening and closing operation of the hooks 62 is done by a worker pressing a footswitch (not shown).

SUMMARY OF THE INVENTION

Objects to be Solved

Figure 11A:
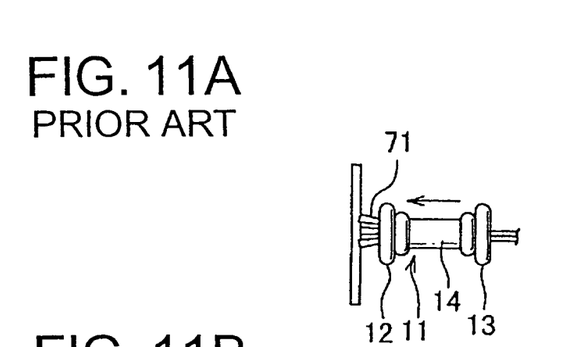
FIG. 11A is a side view of the grommet opening/closing apparatus by prior art in a condition of setting another example of the grommet therein.
Figure 11B:
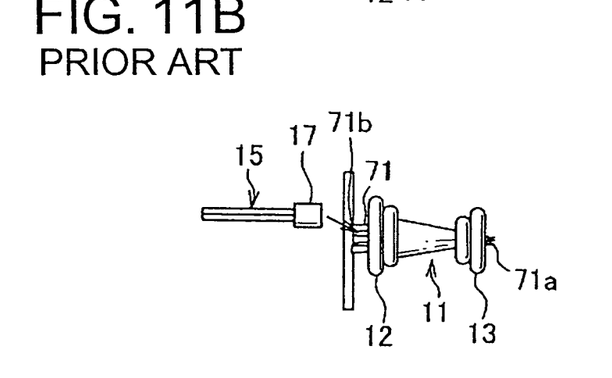
FIG. 11B is a side view of the grommet opening/closing apparatus shown in FIG. 10A in a condition of opening the hooks trying to expand the grommet.

However, for example, it will be discussed in case of that a grommet 11, which has a cylindrical portion 14 and thick stiff fitting portions 12 and 13 at both ends thereof to be fitted in a hole of a panel and a quite small diameter (e.g. an inner diameter of the cylindrical portion 14 is around 12 mm), as shown in FIG. 11A, is used in the grommet opening/closing devices 41 and 61 mentioned above. When passing the four hooks 71 required to be long and thin through the grommet 11, as shown in FIG. 11A, and then opening the hooks 71, as shown in FIG. 11B, each base portion 71b of the hooks 71 opens and expands only a fitting portion 12 at one end of the grommet, but the top portion 71a of the hooks 71 is bent inwardly due to a larger elastic force of a fitting portion 13 at the other end. As a result, the fitting portion 13 at the other side cannot open, and so a connector 17 of a wiring harness 15 cannot pass through the grommet 11. This problem may occur not only when using a grommet 11 with a small diameter, but when using a long grommet with a stiff portion such as the fitting portions 12 and 13 at both ends of a main body of the grommet.

One of a usage of the grommet 11, for example, is as follow; the fitting portion 12 at one end thereof is fitted in a hole of a panel (not shown) of a door at a driver's seat or of a rear door of a car, and the fitting portion 13 at the other end thereof is fitted in a hole of a panel (not shown) of a car body, and electric power is supplied from the car body to the door through the wiring harness 15. The wiring harness 15 and the hole of the panel are waterproofed between the door and the car body by the grommet 11.

To overcome the above drawback, in the view of the points mentioned above, an object of the present invention is to provide a grommet opening/closing apparatus which can smoothly and securely expand a grommet with a stiff portion at both ends thereof, and a method for passing a wiring harness through the grommet using the same.

How to Attain the Object of the Present Invention

In order to attain the object, a grommet opening/closing apparatus according to the present invention has one opening/closing device end and the other opening/closing device, and both opening/closing devices face each other, each having a plurality of hooks and a driving unit to open and close the hooks. A base portion of each of said plurality of hooks of the one opening/closing device expands and returns one end of a grommet, and a base portion of the plurality of hooks of the other opening/closing device expands and returns the other end of the grommet. According to above structure, by opening each of stiff ends of the grommet at the base portion of the hooks of each opening/closing device, the hooks do not bend even if the hooks are thin, and the grommet is securely expanded.

The grommet opening/closing apparatus is more specified in the grommet opening/closing apparatus mentioned above in that the one opening/closing device is fixed on a mounting base, and the other opening/closing device is movable back and forth along the mounting base about the one opening/closing device.

According to above structure, after setting the grommet at the hooks of the one opening/closing device, by sliding the other opening/closing device toward the one opening/closing device, the hooks of the other opening/closing device can be inserted smoothly in the grommet. The grommet, after passing a wiring harness through, is also removed smoothly by sliding the other opening/closing device backward.

The grommet opening/closing device is more specified in the grommet opening/closing device mentioned above in that the hooks of the one opening/closing device and the hooks of the other opening/closing device are arranged alternately.

According to above structure, when the other opening/closing device is moved toward the one opening/closing device and overlapped hooks of both devices are opened and closed, the hooks of both devices can open and close without interfering with each other.

The grommet opening/closing device is more specified in the grommet opening/closing device mentioned above in that the hooks of both opening/closing devices form normal taper shape when closed and inverted taper shape when opened.

According to above structure, the hooks which are closed in normal taper shape (a top of each hook touches to each other and the base of each hook is in apart from each) can be inserted smoothly in the grommet, and also a connector of the wiring harness can be passed smoothly through without any obstructions by the top of the hooks which are opened in inverted taper shape.

A method for passing a wiring harness through a grommet by using the grommet opening/closing apparatus mentioned above is a method for passing a wiring harness through the grommet characterized by steps of half-opening the hooks of the one opening/closing device, holding the one end of the grommet, inserting the closed hooks of the other opening/closing device in the other end of the grommet, opening the hooks of both opening/closing devices and passing the wiring harness through the grommet.

According to above method, by inserting the closed hooks of the one opening/closing device in the end of the grommet (fitting the grommet to the hooks), and by half-opening the hooks of the one opening/closing device, the grommet is held and both hands of a worker is free. Therefore, the worker can hold the grommet with one hand and use the other hand for operating the other opening/closing device to smoothly and securely insert the hooks thereof in the other end of the grommet.

The method for passing a wiring harness through a grommet using the grommet opening/closing apparatus is more specified in the method for passing a wiring harness through a grommet mentioned above by steps of passing the wiring harness through the grommet, closing the other opening/closing device, simultaneously half-closing the one opening/closing device, removing the one end of the grommet from the hooks of the other opening/closing device, completely closing the one opening/closing device, and removing the other end of the grommet.

According to above method, while holding the one end of the grommet by half-opened hooks of the one opening/closing device, the hooks of the other opening/closing device can be removed smoothly from the other end of the grommet. After that, by completely closing the hooks of the one opening/closing device, the one end of the grommet can be removed smoothly without any obstructions by the top of the hooks.

Effects of the Invention

As explained above, according to the present invention, by using the rigid base portion of the hooks of each opening/closing device to open both ends of the grommet, the hooks will not bend even if the hooks are thin (for the grommet with small diameter), and the grommet can be securely expanded. Therefore, the wiring harness can be smoothly and securely passed through the grommet with a stiff portion such as a fitting portion for a hole of a panel at both ends of the grommet.

According to the present invention, by sliding the other opening/closing device back and forth, the hooks of the other opening/closing device can be inserted smoothly in the grommet, and the grommet, after passing the wiring harness therethrough, can be removed smoothly.

According to the present invention, even when the overlapped hooks of both opening/closing devices are opened or closed, the hooks of the both opening/closing devices do not interfere with each other, and the grommet can be expanded and returned smoothly and securely.

According to the present invention, the grommet can be smoothly set to the hooks closed in tapered shape, and the wiring harness can be passed smoothly through the grommet along the hooks opened in inverse tapered shape without any obstructions by the top of the hooks.

According to the present invention, by temporarily holding the one end of the grommet with the hooks of the one opening/closing device, a worker can hold the grommet with one hand and use the other hand for operating the other opening/closing device to smoothly and securely insert the hooks thereof in the other end of the grommet.

According to the present invention, while holding the one end of the grommet by the hooks of the one opening/closing device, the hooks of the other opening/closing device can be removed smoothly from the other end of the grommet. After that, by completely closing the hooks of the one opening/closing device, the grommet can be removed smoothly without any obstructions by the hooks.

The above and other objects and features of this invention will become more apparent from the following description taken in conjunction with the accompanying drawings.

DESCRIPTION OF THE PREFERRED EMBODIMENT

One embodiment of a grommet opening/closing apparatus and a method for passing a wiring harness through a grommet using the grommet opening/closing apparatus according to the present invention are explained with reference to FIGS. 1A-6.

Figure 1A:
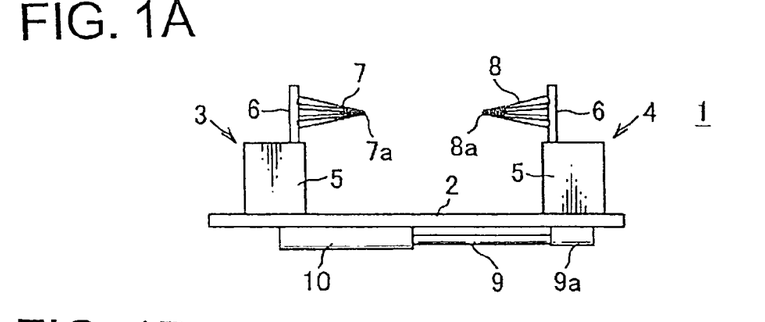
FIG. 1A is a side view of a grommet opening/closing apparatus in accordance with one embodiment of the present invention.

As shown in FIG. 1A, a grommet opening/closing apparatus 1 is provided with a fixed opening/closing device 3 which is fixed at a horizontal mounting base 2, and a movable opening/closing device 4 which is arranged at the mounting base 2 so that the movable opening/closing device 4 is able to move back and forth about the fixed opening/closing device 3.

Both opening/closing devices 3 and 4 have a driving source 5 such as a motor, a driving unit 6 perpendicularly projecting from the driving source 5, a plurality of hooks 7 and 8 projecting slantwise from the driving unit 6. The plurality of hooks 7 and 8 are composed of four pin-shaped hooks respectively and are able to open and close. Structures such as links, arms, or levers used in the conventional examples are applicable for the driving unit 6. Examples of the driving unit 6 and the like are further specified later on in FIG. 7 and FIG. 8.

When one side of the mounting base 2, at which the fixed opening/closing device 3 is arranged, is defined as a front side, the other side of the mounting base 2, at which the movable opening/closing device 4 is arranged, is defined as a rear side. The driving unit 6 of the fixed opening/closing device 3 is arranged nearer a rear end of the driving source 5, and the driving unit 6 of the movable opening/closing device 4 is arranged nearer a front end of the driving source 5.

Both opening/closing devices 3 and 4 are arranged opposing to each other at the front and rear side. The movable opening/closing device 4 is manually movable back and forth toward the fixed opening/closing device 3 along a stretchable guiding rod 9. The rod 9 is arranged at a reverse side of the mounting base 2, and is connected with the movable opening/closing device 4 at a tip portion 9a of the rod 9 through a slit hole (not shown) of the mounting base 2. A large-diametric hollow receiving cylinder 10, which receives the rod 9, is fixed on the mounting base 2 just beneath the fixed opening/closing device 3.

The fixed opening/closing device 3 can be moved not only manually but automatically by using an air cylinder having the rod 9 and the receiving cylinder 10. In this case, the receiving cylinder 10 as a fixed side will be a main body of the air cylinder, and the rod 9 as a movable side will be a rod. A compressing operation of the air cylinder, i.e. an operation of moving the movable opening/closing device 4 forward, can be acted manually by opening the air pressure, and an extension operation of the air cylinder, i.e. an operation of moving the movable opening/closing device 4 backward, can be acted automatically by using the force of compressed air. Also, instead of the rod 9, a horizontal slit hole (not shown) or a groove (not shown) at the mounting base 2 can be used as a guide for sliding the movable opening/closing device 4.

Each of the hooks 7 and 8 of both opening/closing devices 3 and 4 has a round section and a tapered-off tip. In closed condition each of the hooks 7 and 8 is arranged at a slant toward a center, and the tip portions 7a and 8a of hooks 7 and 8 approach or touch each other respectively. The tip portions 7a and 8a are arranged on the same horizontal axis, facing each other.

Figure 1B:
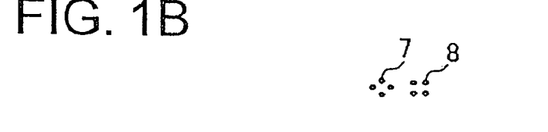
FIG. 1B is a front view showing an arrangement of hooks of both grommet opening/closing apparatus shown in FIG. 1A.

As shown in FIG. 1B, four hooks of hooks 7 of the fixed opening/closing device 3 are arranged each on the left, right, top and bottom of the driving portion 6, at intervals of 90 degrees, in other words, on each vertex of a rhombus looking in a front view. Meanwhile, four hooks of hooks 8 of the movable opening/closing device 4 are arranged each two on the left, right, top and bottom of the driving portion 6, in a line, in other words, on each vertex of a square looking in a front view. Alternatively, the four hooks of the movable opening/closing devise 4 can be arranged on each vertex of the rhombus, and the four hooks of the fixed opening/closing devise 3 can be arranged on each vertex of the square.

By arranging the hooks 7 and 8 alternately as mentioned above, at the time when both opening/closing devices are moved toward each other and overlapped the hooks 7 and 8 of the both opening/closing devices, the hooks 7 and 8 can be opened smoothly without interfering each other.

Figure 1C:
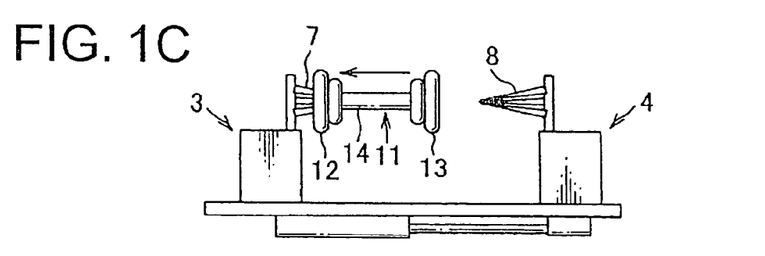
FIG. 1C is a side view showing a grommet setting condition in a method for passing a wiring harness through a grommet using the grommet opening/closing apparatus.

Firstly, with the hooks 7 and 8 in the closed condition, as shown in FIG. 1C, the hooks 7 of the fixed opening/closing device 3 are inserted in fitting portion 12 at one side (one end) of an elastic grommet 11 (the hooks 7 are inserted in the fitting portion 12). Since the hooks 7 and 8 are form tapered shape in closed condition, an edge of an inner periphery of the grommet 11 abuts elastically on an intermediate portion in a lengthwise direction (closer to a base of the hooks) of the hooks 7, so as to prevent further insertion of the hooks 7 in the grommet 11.

The grommet 11, which is similar to the one described in an example by prior art shown in FIG. 9, is an elastic body made of a synthetic rubber, formed integrally with a cylinder 14 having a small diameter and fitting portions 12 and 13 having larger diameters which are thicker and more rigid than the cylinder 14.

Figure 2A:
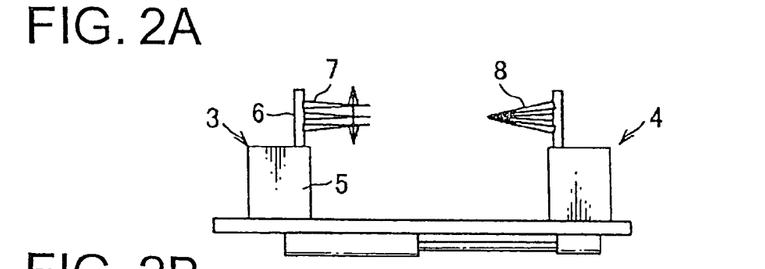
FIG. 2A is a side view of the grommet opening/closing apparatus in the condition of half-opened hooks of one opening/closing device.
Figure 2B:
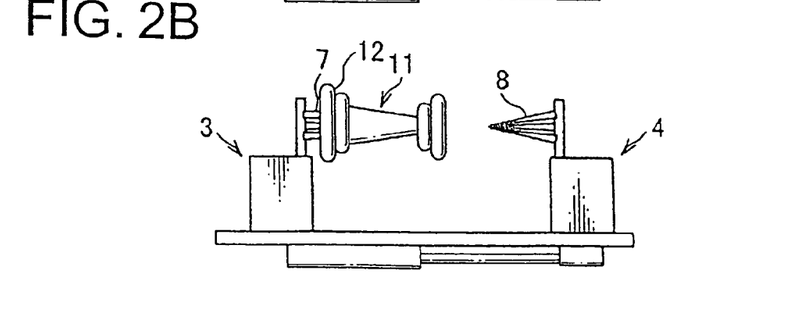
FIG. 2B is a side view of the grommet opening/closing apparatus in a condition of temporarily expanded one end of the grommet.

Next, as shown in FIG. 2A and FIG. 2B, the hooks 7 of the fixed opening/closing device 3 are half-opened, and the fitting portion 12 at the one side of the grommet 11 is held and fixed at the hooks 7. By temporarily holding the grommet 11 with the hooks 7 as described, both hands of a worker can be free so that upcoming process (FIG. 3A and FIG. 3B) becomes easy to be handled.

The temporary opening of the hooks 7 can be operated by a worker pressing a footswitch (not shown). The footswitch, for example, is connected to the driving source 5 of the fixed opening/closing device 3 through a controlling portion (not shown), and the driving source 5 drives the driving portion 6 to temporarily open the hooks 7. FIG. 2A is the same as FIG. 2B, other than removing the grommet 11 to show the condition of the hooks 7 inside the grommet 11, and FIG. 3A and FIG. 3B, FIG. 4A and FIG. 4B, and FIG. 5A and FIG. 5B mentioned below will be explained in a similar way.

Figure 3A:
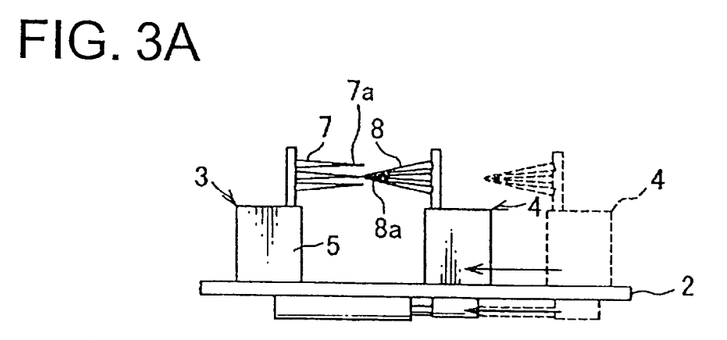
FIG. 3A is a side view of the grommet opening/closing apparatus in a condition of moving the other opening/closing device.
Figure 3B:
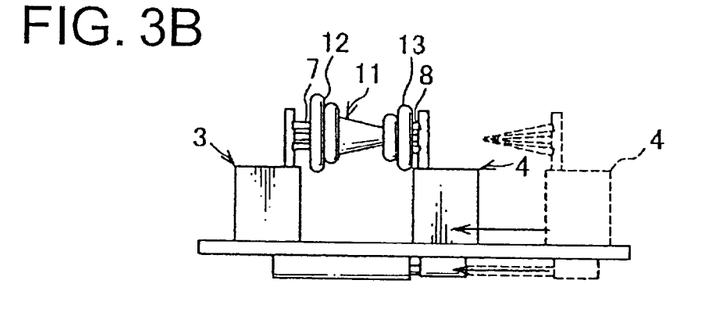
FIG. 3B is a side view of the grommet opening/closing apparatus in a condition of hooks of the other opening/closing device inserted in the grommet.

As shown in FIG. 3A and FIG. 3B, by manually sliding the movable opening/closing device along the mounting base 2 toward the fixed opening/closing device 3, the closed hooks 8 of the movable opening/closing device 4 is inserted in the fitting portion 13 at the other side of the grommet 11 which is held on the fixed opening/closing device 3. Since the worker can use both hands freely, as mentioned above, the worker can hold the grommet 11 in a horizontal position with one hand and simultaneously move the movable opening/closing device 4 toward the grommet 11, in a direction shown with an arrow in FIG. 3A and FIG. 3B, with the other hand, and the hooks 8 of the movable opening/closing device 4 can be inserted smoothly and securely in the fitting portion 13 on the other side of the grommet 11.

As shown in FIG. 3A, the tip portion 8a of the closed hooks 8 of the movable opening/closing device 4 approaches to an inside and at the center of the tip portion 7a of the half-opened hooks 7 of the fixed opening/closing device 3 without any interference. Since the hooks 8 of the movable opening/closing device 4 forms tapered shape in closed condition, as shown in FIG. 3B, the edge of the inner periphery of the grommet 11 touches to the intermediate portion in a lengthwise direction (closer to the base of the hooks) of the hooks 8, for preventing further insertion of the hooks 8 in the grommet 11.

Figures 4A, 4B:
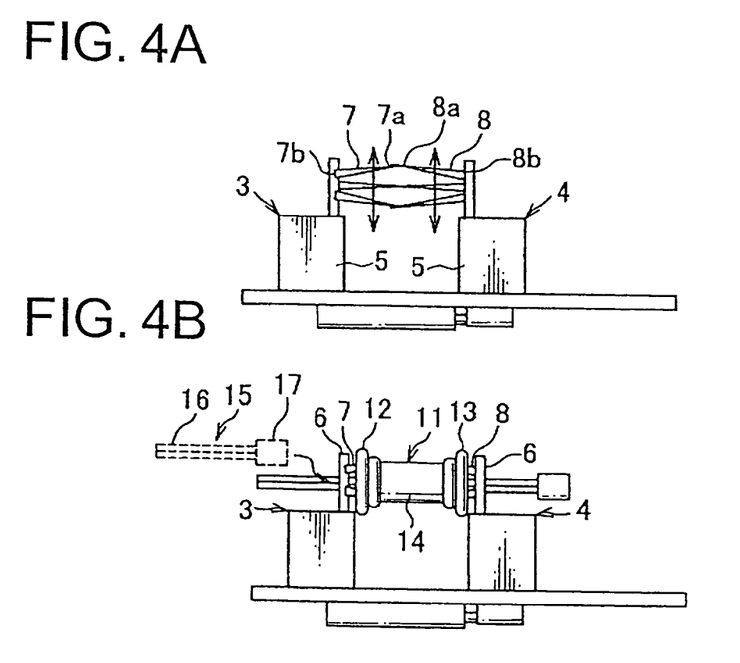
FIG. 4A is a side view of the grommet opening/closing apparatus in a condition of completely opened hooks of the both opening/closing devices.
FIG. 4B is a side view of the grommet opening/closing apparatus in a condition of passing a wiring harness through the grommet.

Thereafter, as shown in FIG. 4A and FIG. 4B, the hooks 7 and 8 of the both opening/closing devices 3 and 4 are completely opened as shown by the arrows, to expand the both fitting portions 12 and 13 of the grommet 11 with the base portion of the hooks 7 and 8. By expanding the fitting portions 12 and 13 with the base portion of the hooks 7 and 8, even if the hooks 7 and 8 are thin, the inward bending of the hooks are prevented, and so the stiff fitting portions 12 and 13 can be expanded securely. Since the tip portions 7a and 8a of the hooks 7 and 8 of the opening/closing devices 3 and 4 extend to the intermediate portion in a lengthwise direction of the grommet 11, the cylinder 14 is expanded simultaneously together with the fitting portions 12 and 13.

In addition, the hooks 7 and 8 of the both opening/closing devices 3 and 4, as shown in FIG. 1B, are arranged to be shifted by phase, for example in a clockwise direction, so that the hooks 7 and 8 are smoothly and completely opened without any interference of the tips of the hooks 7 and 8, as shown in FIG. 4A.

Figure 8:
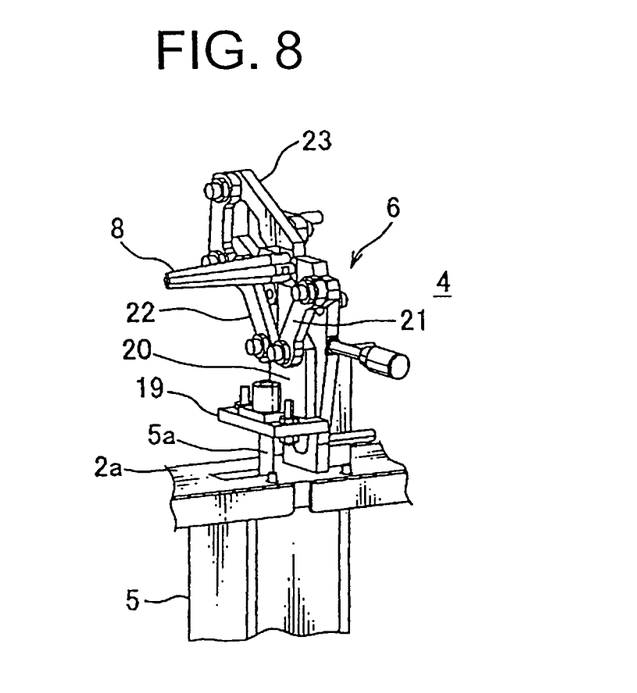
FIG. 8 is a perspective view of the specific example of the grommet opening/closing apparatus including a driving unit.

When the hooks 7 and 8 are completely opened, the tip portions 7a and 8a open larger about a diameter thereof than and outside of the base portions 7b and 8b, and the hooks 7 and 8 form an inverse tapered shape (the tip side open) which is inverse of the closed condition as shown in FIG. 8B. The hooks 7 and 8 are completely opened by pressing the footswitch (not shown) by the worker. The footswitch, for example, is connected to the driving source 5 of the both opening/closing devices 3 and 4 thorough a controlling portion.

By completely opening the hooks 7 and 8 of the both opening/closing devices 3 and 4 simultaneously, shift in position in the lengthwise direction of the grommet 11 does not occur, and the complete opening of the hooks 7 and 8 can be achieved smoothly and securely. It is possible to first completely open the hooks 7 of the fixed opening/closing device 3 and thereafter, completely open the hooks 8 of the movable opening/closing device 4. However, in this case, when the hooks 7 are completely opened, the grommet 11 may be pushed toward the side of the movable opening/closing device 4, which causes an obstruction of the smooth opening, or a buckling distortion of the cylinder 14 of the grommet 11.

As shown in FIG. 4B, a wiring harness 15 is passed through the expanded grommet 11. The connector 17 on an end of the wiring harness 15 is passed into the grommet 11 through the inner space of the completely opened hooks 7 of the fixed opening/closing device 3, and led out through the inner space of the completely opened hooks 8 of the movable opening/closing device 4.

Each of the driving portions 6, which holds the hooks 7 and 8 of the both opening/closing devices 3 and 4, has a hole or an aperture (not shown) to pass the connector 17 therethrough. The wiring harness 15 has a plurality of electronic wires 16 and the connector 17, in which a terminal (not shown) connected to the end of the electronic wire 16 is covered with a connector housing made of an insulated resin. It is also possible to pass the connector 17 from the movable opening/closing device 4 to the fixed opening/closing device.

As shown in FIG. 4A, when the hooks 7 and 8 are completely opened, the tip portions 7a and 8a open larger than the base portions 7b and 8b. Therefore, the connector 17 inside the cylinder 14 of the grommet 11 does not hit the tip portion 8a of the hooks 8 and so smoothly pass thorough along the inner surface of the hooks 8 which has the inverse tapered shape.

Figure 5A:
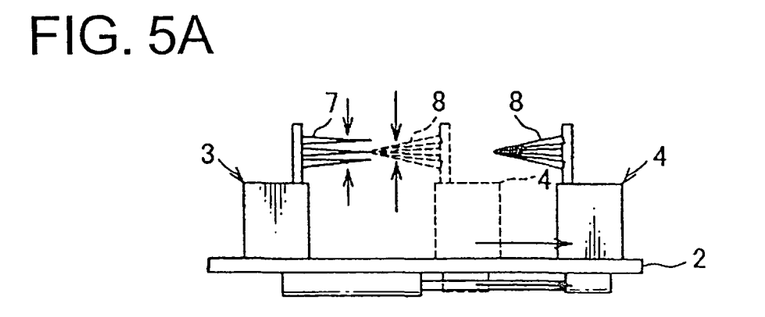
FIG. 5A is a side view of the grommet opening/closing apparatus in a condition of closing and moving the hooks of the other opening/closing device back.
Figure 5B:
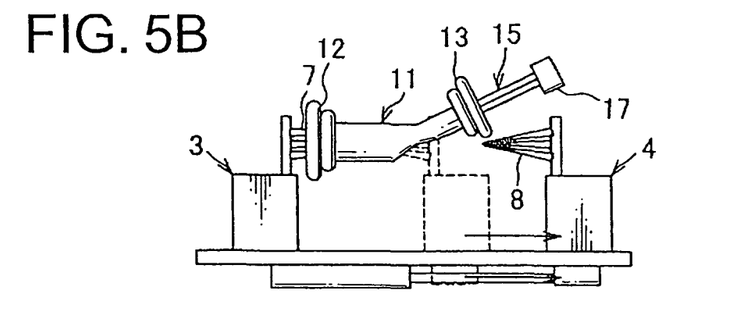
FIG. 5B is a side view of the grommet opening/closing apparatus in a condition of moving the other end of the grommet apart from the hooks.

Thereafter, as shown in FIG. 5A and FIG. 5B, the hooks 8 of the movable opening/closing device 4 are closed, and the movable opening/closing device 4 is slid backward along the mounting base 2 as shown with the arrow, and simultaneously the fitting portion 13 of the grommet 11 is removed together with the wiring harness 15 from the hooks 8 of the movable opening/closing device 4. The hooks 7 of the fixed opening/closing device 3 are closed to be in a half-opened condition for holding the grommet 11 with a small force. The operations of closing of the hooks 8 of the movable opening/closing device 4 and the temporary closing (half-closing) of the hooks 7 of the fixed opening/closing device 3 are acted continuously by a worker pressing the footswitch.

By producing a time lag between closings of the hooks 7 and 8 of the both opening/closing device 3 and 4, the hooks 7 and 8 are closed smoothly without any interference. In addition, by completely closing the hooks 8 of the movable opening/closing device 4 and half closing the hooks 7 of the fixed opening/closing device 3, the fitting portion 12 at the one side of the grommet 11 is fixed temporarily by the hooks 7, and therefore, the grommet 11 is smoothly removed from the hooks 8 of the movable opening/closing device 4.

Figure 6:
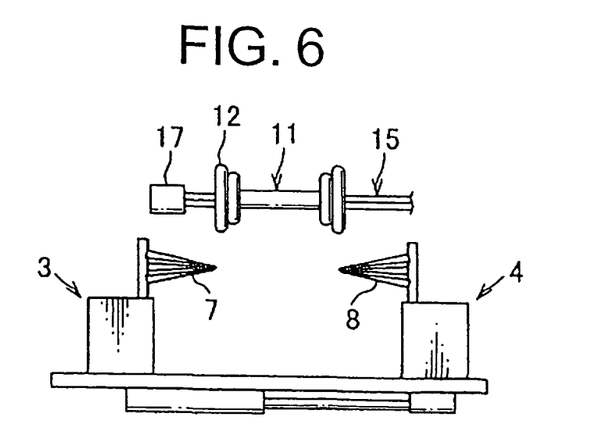
FIG. 6 is a side view of the grommet opening/closing apparatus in a condition of moving the grommet apart from the hooks of the one opening/closing device.

Next, as shown in FIG. 6, the hooks 7 of the fixed opening/closing device 3 are completely closed, and the fitting portion 12 at the one end of the grommet 11 is removed from the hooks 7 of the fixed opening/closing device 3, together with the wiring harness 15. The wiring harness 11 has the connector 17 at both ends thereof. The closing of the hooks 7 is operated by pressing the footswitch. As shown in FIG. 5A, FIG. 5B, FIG. 6A and FIG. 6B, complete closing of the hooks 7 and 8 prevents the damaging of the grommet 11 by the tip portions 7a and 8a when removing the grommet 11.

In the embodiment mentioned above, the fixed opening/closing device 3 and the movable opening/closing device 4 are used, but, the fixed opening/closing device 3 can be movable (or both opening/closing devices can be movable), to slide only half the distance according to the length of the grommet 11 to achieve more efficient movement.

When the cylinder 14 of the grommet 11 is flexibly stretchable in a lengthwise direction thereof, both opening/closing devices 3 and 4 can be fixed, so that the grommet 11 is compressed and then inserted in the hooks 7 and 8 of the both opening/closing devices 3 and 4, or is removed from the hooks 7 and 8.

Figure 7:
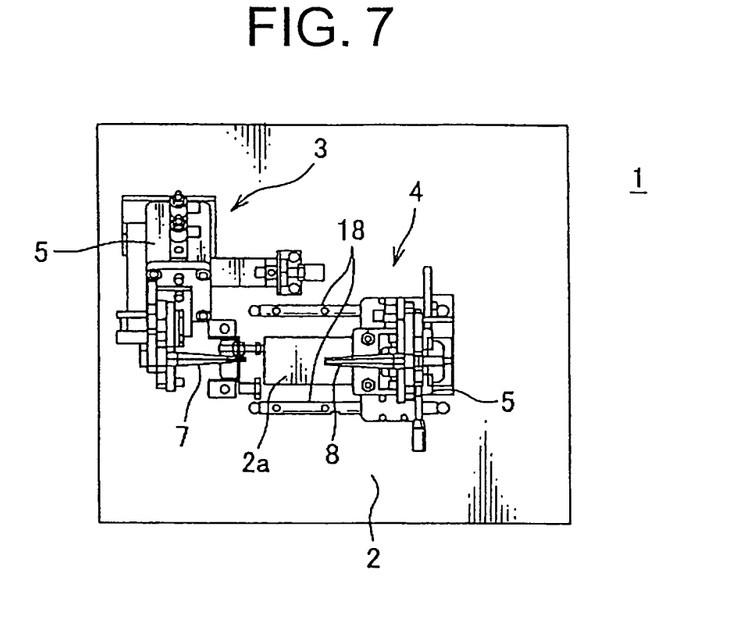
FIG. 7 is a plan view of a specific example of the grommet opening/closing apparatus.

FIG. 7 is a plan view showing one specific example of the grommet opening/closing apparatus 1, and FIG. 8 is a perspective view of the one specific example of the opening/closing device 6. The same numerical reference as FIG. 1 is used for the similar operative components.

In FIG. 7, the movable opening/closing device 4 is arranged on a right side of the horizontal mounting base 2, and the fixed opening/closing device 3 is arranged on a left side thereof. The movable opening/closing device 4 slides freely back and forth along a pair of guiding rails 18 on the mounting base. The movable opening/closing device 4, as shown in FIG. 8, is arranged perpendicularly to the mounting-base portion 2a, while the fixed opening/closing device 3 is arranged at the mounting base 2 (as shown in FIG. 7) inclined to the mounting base 2 with an angle of inclination of 45 degrees, consequently the hooks 7 and 8 of the both opening/closing devices 3 and 4 are arranged alternately.

In FIG. 7, a numerical reference 5 shows a cylinder as a driving source arranged slantwise, and a numerical number 7 shows the four hooks which are driven to open and close by up-and-down operation of a rod of a cylinder 5. Since a basic structure of both opening/closing device 3 and 4 are the same, a structure of the movable opening/closing device 4 is explained below for both.

In FIG. 8, a horizontal plate 19 is fixed to a rod 5a of the vertical cylinder 5, and a vertical plate 20 is arranged vertically to the horizontal plate 19. A matched pair of links 21 and 22 is rotatably supported symmetrically at the vertical plate 20. An L-shaped link 23 is supported about an axis on the link 22, and each one of the total of four hooks 8 is projected horizontally from the each of the links 21, 22, 23 and the vertical plate 20 respectively. The links 21, 22, 23 open and close according to an up-and-down operation of the rod 5a, so as to open and close the three of the hooks 8 including hooks at right, left and top against the hook at bottom. The four hooks 8 open and close to each direction of left, right, top and bottom. Each of the hooks 7 of the fixed opening/closing device 3, in FIG. 7, opens and closes slantwise, with an angle of inclination of 45 degrees to the opening/closing direction of the hooks 8 of the movable opening/closing device 4.

The invention claimed is:

1. A grommet opening/closing apparatus for expanding a grommet, comprising:
   one opening/closing device; and
   another opening/closing device facing the one opening/closing device,
   wherein both the opening/closing devices respectively comprise a plurality of hooks which form a tapered shape when closed and an inverse tapered shape when opened and a driving portion opening and closing said hooks,
   wherein a base portion of each of said plurality of hooks of said one opening/closing device expands and returns one end of the grommet, and a base portion of each of said plurality of hooks of said another opening/closing device expands and returns another end of said grommet.

2. The grommet opening/closing apparatus according to claim 1, wherein said one opening/closing device is fixed at a mounting base, and said another opening/closing device is movable along said mounting base, back and forth about said one opening/closing device.

3. The grommet opening/closing apparatus according to claim 2, wherein each of said hooks of said one opening/closing device and each of said hooks of said another opening/closing device are arranged alternately.

4. The grommet opening/closing apparatus as in claim 3, wherein said hooks of said both opening/closing devices form tapered shape when closed and inverse tapered shape when opened.

5. A method for passing a wiring harness through said grommet by using said grommet opening/closing apparatus as in claim 4, comprising the steps of:
   half-opening said hooks of said one opening/closing device;
   holding one end of said grommet;
   inserting the closed hooks of the another opening/closing device;
   opening the hooks of both opening/closing devices; and
   passing said wiring harness through said grommet.

6. A method for passing a wiring harness through said grommet by using said grommet opening/closing apparatus as in claim 3, comprising the steps of:
   half-opening said hooks of said one opening/closing device;
   holding one end of said grommet;
   inserting the closed hooks of the another opening/closing device;
   opening the hooks of both opening/closing devices; and
   passing said wiring harness through said grommet.

7. The grommet opening/closing apparatus as in claim 2, wherein said hooks of said both opening/closing devices form a tapered shape when closed and inverse tapered shape when opened.

8. A method for passing a wiring harness through said grommet by using said grommet opening/closing apparatus as in claim 7, comprising the steps of:
   half-opening said hooks of said one opening/closing device;
   holding one end of said grommet;
   inserting the closed hooks of the another opening/closing device;
   opening the hooks of both opening/closing devices; and
   passing said wiring harness through said grommet.

9. A method for passing a wiring harness through said grommet by using said grommet opening/closing apparatus as in claim 2, comprising the steps of:
   half-opening said hooks of said one opening/closing device;
   holding one end of said grommet;
   inserting the closed hooks of the another opening/closing device;
   opening the hooks of both opening/closing devices; and
   passing said wiring harness through said grommet.

10. A method for passing a wiring harness through said grommet by using said grommet opening/closing apparatus according to claim 9, further comprising the steps of:
   after passing said wiring harness through said grommet,
   closing said another opening/closing device;
   simultaneously half-closing said one opening/closing device;

removing said one end of said grommet from said hooks of said other opening/closing device;

completely closing said one opening/closing device; and removing said other end of said grommet.

11. The grommet opening/closing apparatus according to claim 1, wherein each of said hooks of said one opening/closing device and each of said hooks of said another opening/closing device are arranged alternately.

12. The grommet opening/closing apparatus as in claim 11, wherein said hooks of said both opening/closing devices form a tapered shape when closed and inverse tapered shape when opened.

13. A method for passing a wiring harness through said grommet by using said grommet opening/closing apparatus as in claim 12, comprising the steps of:

half-opening said hooks of said one opening/closing device;

holding one end of said grommet;

inserting the closed hooks of the another opening/closing device;

opening the hooks of both opening/closing devices; and passing said wiring harness through said grommet.

14. A method for passing a wiring harness through said grommet by using said grommet opening/closing apparatus as in claim 11, comprising the steps of:

half-opening said hooks of said one opening/closing device;

holding one end of said grommet;

inserting the closed hooks of the another opening/closing device;

opening the hooks of both opening/closing devices; and passing said wiring harness through said grommet.

15. A method for passing a wiring harness through said grommet by using said grommet opening/closing apparatus according to claim 14, further comprising the steps of:

after passing said wiring harness through said grommet, closing said another opening/closing device;

simultaneously half-closing said one opening/closing device;

removing said one end of said grommet from said hooks of said other opening/closing device;

completely closing said one opening/closing device; and removing said other end of said grommet.

16. A method for passing a wiring harness through said grommet by using said grommet opening/closing apparatus as in claim 1, comprising the steps of:

half-opening said hooks of said one opening/closing device;

holding one end of said grommet;

inserting the closed hooks of the another opening/closing device;

opening the hooks of both opening/closing devices; and passing said wiring harness through said grommet.

17. A method for passing a wiring harness through said grommet by using said grommet opening/closing apparatus according to claim 16, further comprising the steps of:

after passing said wiring harness through said grommet, closing said another opening/closing device;

simultaneously half-closing said one opening/closing device;

removing said one end of said grommet from said hooks of said other opening/closing device;

completely closing said one opening/closing device; and removing said other end of said grommet.

\* \* \* \* \*